United States Patent [19]

Hathaway

[11] 4,413,293

[45] Nov. 1, 1983

[54] MAGNETIC TAPE TRANSPORT

[75] Inventor: Richard A. Hathaway, Saratoga, Calif.

[73] Assignee: Ampex Corporation, Redwood City, Calif.

[21] Appl. No.: 255,127

[22] Filed: Apr. 17, 1981

[51] Int. Cl.³ .......................... G11B 5/08; G11B 5/10; G11B 15/00
[52] U.S. Cl. ...................................... 360/85; 360/95; 360/128
[58] Field of Search ....................... 360/85, 92, 93, 95, 360/128

[56] References Cited

U.S. PATENT DOCUMENTS

| | | | |
|---|---|---|---|
| 3,720,794 | 3/1973 | Dolby | 360/85 |
| 3,890,641 | 6/1975 | Mo | 360/128 |
| 3,940,791 | 2/1976 | Kayan | 360/95 |
| 3,984,870 | 10/1976 | Inoue | 360/85 |
| 4,056,833 | 11/1977 | Schulz | 360/85 |
| 4,101,944 | 7/1978 | Inoue | 360/85 |

Primary Examiner—Robert Martin Kilgore
Attorney, Agent, or Firm—Joel D. Talcott; Charles M. Carman, Jr.

[57] ABSTRACT

This is a magnetic tape transport primarily for the automatic threading and replay of cassette-mounted tapes that were originally produced upon the same transport or upon a different recording transport having a single rotating head and guide around which the tape is wrapped in a substantially 360-degree omega path. To be adapted for replay of the cassette-mounted tapes, the replay transport differs from the omega-wrap recording transport in having two diametrically opposite rotating heads and a substantially 180-degree tape wrap, and the heads rotate at half the rotational speed of the omega-wrap transport head. The threading means are of the differential air-pressure type.

12 Claims, 2 Drawing Figures

FIG_1

MAGNETIC TAPE TRANSPORT

BACKGROUND OF THE INVENTION

This invention relates to magnetic tape transport, and particularly to such transports having provision for automatic threading of cassette-mounted tapes.

Magnetic tape transports adapted to automatic threading of cassette-mounted tapes are known in the art, e.g. U.S. Pat. Nos. 3,784,761, 3,831,198, 3,864,742, 3,866,856, 3,911,491, 3,940,791, 3,979,772, 4,035,842, 4,056,834, 4,074,329, 4,166,283, 4, 191,979, 3,984,870, and 4,101,944. In particular U.S. Pat. No. 3,940,791 (same assignee as the present application) shows automatic threading by means of differential air pressure apparatus, which pulls a loop of tape from the cassette and carries the loop 180 degrees around a rotating scanning drum having a pair of diametrically opposite scanning heads. The differential air pressure means keeps the shanks of the loop separated during the threading process, and a curved guide is then inserted in a direction axially parallel to the head drum to keep the radially outer shank away from the inner one, which is in contact with the scanning drum, before the differential air pressure means is shut off in preparation for recording or playing the tape.

U.S. Pat. Nos. 3,984,870 and 4,101,944 also show guides that are inserted into the loop as it is pulled around the drum by a mechanical threading apparatus.

Now, in the field of use for which the present invention is intended, it is desired to record a magnetic tape with, say, a television spot commercial of a few minutes length, the recording having been made on a high-quality studio recorder of the so-called "omega-wrap" type, and mount the tape in a cassette, then place the cassette in a magazine drum along with numerous others, for automatic selected replay in a television broadcasting studio. A machine for such use is disclosed in U.S. Pat. No. 3,720,794 wherein the rotating head drum has four heads and scans the tape transversely. To adapt such a machine for threading tape from a cassette and around an omega-wrap head drum (having only one head and a wrap of substantially 360 degrees) embodies grave difficulties. Of course, the transverse-scan rotating head cannot be arranged to follow the substantially diagonal track made by the omega-wrap head of the original recording machine. On the other hand, to provide an omega-wrap head structure in a machine of the complexity of that shown in U.S. Pat. No. 3,720,794 risks the production of low-quality results. The greatest problem lies in providing accurate positioning for the moving guides that operate to snug the tape close to the helical scan guide at the two closely adjacent ends of the substantially 344-degree tape wrap, i.e. at the "neck" of the omega where the tape sharply bends going to and from the drum. The guides must be so close that their movements tend to interfere. Such guides would have to move pivotally as well as linearly in order to properly position the tape around the scanner. The quality of the guiding, or lack of it, is extremely sensitive to the absolute position of these guides. The fact with known omega-wrap machines, all of which have fixed guides, a delicate adjustment is usually also provided to ensure their correct positioning. With movable guides, the problem of giving them accurate tape-guiding positions and inclinations at the end of their movement is substantially insoluble; or at least it is not soluble with the simplicity embodied in the present invention.

An example of the complexity involved in the automatic threading of an "alpha-wrap" machine (in which the tape makes a more-than-360-degree wrap) is shown in U.S. Pat. No. 4,191,979, and the critical problem of accurate positioning of the guides at the end of their movement is discussed in Column 12. The problem is much more severe in omega-wrap machines, since the end positions of the guides are much closer.

Accordingly, the present invention avoids the omega-wrap problem by using a two-headed 180-degree wrap in the playback machine, and this machine is especially arranged to be compatible with the one-headed 344-degree omega-wrap recording machine by making the 180-degree-wrap scanning drum twice the diameter of the omega-wrap drum, and by driving the heads at one-half the rotational speed of the omega-wrap head. Thus each of the 180-degree wrap heads scans the tape at the same head-to-tape speed, and covers the same length of track in the same time span, as does the single head of the omega-wrap machine. The simplicity of structure required for this novel arrangement and the fidelity of the result that can be produced, stands in sharp contrast with the complexity and low-quality result that must characterize the omega-wrap alternative.

It should be recognized that tape tension due to frictional build up will be different at various identical parts of the wording due to the differences in wrap angle between the present invention and the omega machine, that the effect of these differences can easily be overcome by use of the well-known "wide-window" time base corrector now extant.

It will of course be understood that the original recorder of the omega-wrap type is not subject to the same difficulties, since it is not required to handle cassette-mounted tape automatically, and can be threaded by hand over permanently-fixed guides.

Accordingly, it is an object of the present invention to provide a non-omega-wrap magnetic tape cassette transport of the automatic self-threading type that is compatible with and can interchange tapes with an omega-wrap machine.

BRIEF DESCRIPTION OF THE INVENTION

This and other objects are attained in the present invention in which this is a magnetic tape transport primarily for the automatic threading and replay of cassette-mounted tapes that were originally produced upon the same transport or upon a different recording transport having a single rotating head and guide around which the tape is wrapped in a substantially 360-degree omega path. To be adapted for replay of the cassette-mounted tapes, the replay transport differs from the omega-wrap recording transport in having two dramatically opposite rotating heads and a substantially 180-degree tape wrap, and the heads rotate at half the rotational speed of the omega-wrap transport head. The threading means are of the differential air-pressure type.

DETAILED DESCRIPTION OF THE PREFERRED EMBODIMENTS

Figure 1:
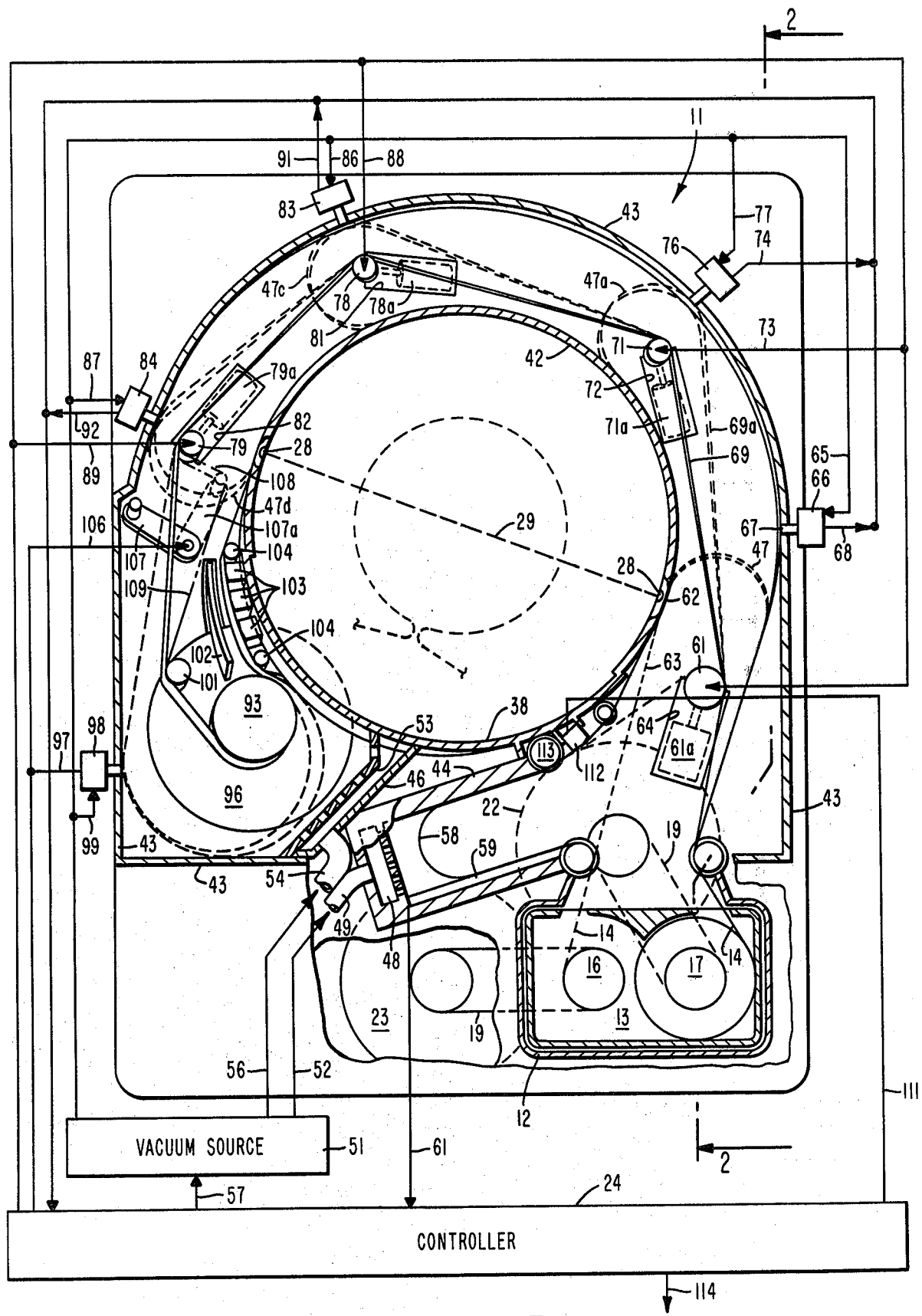
FIG. 1 is a plan view, partly in section, and partly broken-away, of a magnetic tape transport according to the present invention with a tape path of the omega type superimposed in phantom.

Referring to both Figures of the drawings, there is shown a transport 11 having a holding and positioning chamber 12 for a magnetic tape cassette 13. In the cassette, the tape 14 is stored on two hubs, namely the supply hub 16, and the takeup hub 17. The takeup hub 17 has an initial store of tape long enough to form the threading tape loop (later described). When the cassette is seated in its chamber 12, the two tape hubs are engaged by a pair of spindles 18, which are driven through belts 19 by the shafts 21 of a pair of supply and takeup drive motors 22 and 23.

A control means 24 is provided to operate the motors 22, 23 (as shown by arrows 26 and 27) as well as various other elements to be described, in certain timed sequences also to be described.

The transport 11 includes a rotating head assembly comprising a pair of magnetic transducing heads 28 mounted on a drum (not shown) at the opposite ends of a diameter 29, the drum being mounted for rotation on a shaft 31, which is driven by a motor 32, the motor in turn being supported by brackets 33 from a base casting 34, which forms a portion of the chassis of the transport. It should be noted here that this diameter 29 is substantially twice the diameter of the omega wrap tape path 30 upon which the tape 14 was originally recorded. Also the motor 32 is driven under control of the controller 24 at substantially half the rotational speed of the omega-wrap head that made the original recording on tape 14. A pair of cylindrical guides 36 and 37 of the clamshell type, are supported together at the back by a substantially 120-degree curved wall, and for the other 240 degrees of their periphery are spaced apart to define a gap 38 for the protrusion of the rotating heads 28. The lower guide 37 is further supported upon a heavy deck member 39, and the upper guide 36 is suspended from the top 41 of the machine by a partly curved wall 42. An outer curved wall 43 is also provided to define, with the walls 38 and 42, the top 41, the deck 39, and certain other elements, 44 and 46, a substantially air-tight enclosure in the form of a half-circular threading path for a loop 47 of tape to be drawn from the cassette and wrapped half-around the guides 36, 37.

The element 44 is a tape-tensioning vacuum chamber having a manifold chamber 48 and a conduit 49 which receives vacuum from a vacuum source 51 as illustrated schematically by arrow 52. It should be noted that element 44 could be exchanged for a conventional tension arm assembly.

The element 46 is the back wall of another manifold chamber 53 which also receives vacuum from source 51 through a conduit 54, as shown schematically by arrow 56. The vacuum source itself is controlled by the controller 24 as illustrated schematically by arrow 57 to supply its receivers in various timed sequences later to be described.

The threading sequence begins as follows. First, the controller causes vacuum to be applied to chambers 44 and 53 and simultaneously causes the takeup hub 17 to unwind. The vacuum draws a tensioning loop 58 of tape into the chamber, until a desired intermediate length of loop is established. A sensing means 59 of a type well-known in the art, signals to the controller (arrow 61).

The controller then adjusts the vacuum pulls in the two manifolds so as to maintain the loop 58 at its desired length while pulling the main loop 47 around the semi-circular main threading path, fed by controlled unwinding of takeup hub 17.

A pivotably retractable guide 61 is arranged in the tape path just upstream from the point 62 where the radially inner shank 63 first engages the cylindrical guides 36, 37. At the beginning of the threading process, the controller 24 causes the guide 61 to retract into a well 64 below the tap threading path, as shown in phantom (61a) in FIG. 1. At a point downstream from the guide 61, a differential air-pressure sensing mechanism 66 of a type well known in the art is supplied with vacuum by source 51 (arrow 65) and is arranged with an orifice 67 in the side wall 43 communicating with the interior of the threading chamber. As the tape loop 47 arrives and covers the orifice 67, the pressure change sensed by the mechanism 66 causes a signal to be sent to the controller 24 (arrow 68). The controller then causes the guide 61 to pivot upwardly inside the loop 47 and thereafter the outer shank 69 of the threading loop is held by guide 61 away from the inner shank, as illustrated by the phantom shank 69a and loop 47a. The ultimate threaded and operating position of the shank 69 is that shown in solid lines throughout.

The loop and shank positions 47a and 69a are those at which a second pivotably retractable guide 71 is caused to pivot upwardly from a (phantom) position 71a in a well 72, as controlled by controller 24 (arrow 73) after a signal (arrow 74) from a second sensing mechanism 76 supplied (arrow 77) by the source 51. Likewise at third and fourth positions are disposed guides 78 and 79 having retracted position 78a and 79a in wells 81 and 82, respectively; and these guides are appropriately intruded into the respective loops 47c and 47d (arrows 88, 89) as the loops arrive at sensors 83 and 84, supplied (arrows 86, 87) by source 51 and sending tape pressure signals (arrows 91, 92) to the controller 24.

Figure 2:
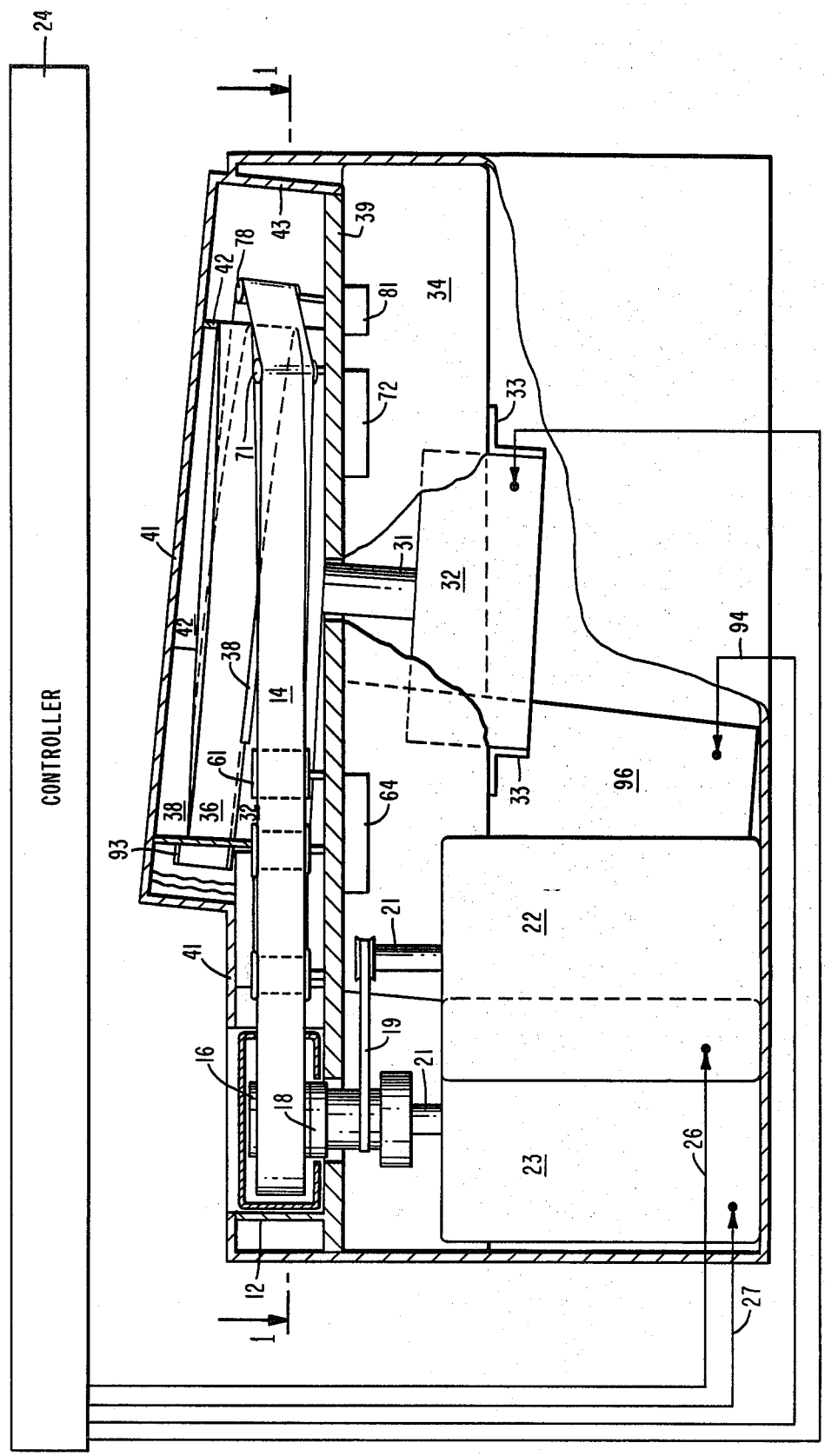
FIG. 2 is a right side elevation view to a slightly different scale, partly in section and partly broken-away, of the transport shown in FIG. 1.

At the end of the tape threading chamber, adjacent manifold 53, there is positioned an axially retracted capstan 93, which is driven under control of the controller 24 (arrow 94, FIG. 2) for both intrusion, retraction and rotation by a mechanism 96 well-known in the art. The intrusion signal (arrow 97) to the controller 24 is provided by a sensing mechanism 98 supplied (arrow 99) by the source 51.

Also intruded with the capstan 93 is a final outer shank guide 101 and a shield element 102 for a set of longitudinal heads 103 and guides 104, this set being permanently mounted on wall 38.

A certain time after the capstan-intrusion signal is given, the controller 24 causes (arrow 106) a storage loop arm 107 to pivot inwardly (phantom 107a) against the outer shank of the tape so as to form a storage loop (phantom lines 108, 109) near the capstan, for a purpose to be explained below. The controller then causes the vacuum supply to chamber 53 to be inactivated and the supply hub 16 to rewind the tape until it it snug on the capstan and all guides, and the tension loop sensing means 59 notifies the controller that correct tape tension has been achieved. The threading process is now finished.

For normal forward recording or replay operation, the capstan 93 drives the tape, and the cassette tape hubs 16 and 17 are driven, all under control of the controller 24, in accordance with tape tension signals (61) from the sensor 59.

When forward operation is completed, the tape can no longer move from supply hub 16 and the loop 58 shortens in the chamber 44, causing a stop signal (61) to the controller, which then issues the necessary instructions.

Before the cassette 13 can be removed from the machine, the tape loop 47 must be pulled from the machine and the cassette must (usually) be rewound. Upon being activated for such operations, the controller first causes the storage loop arm 107 to be retracted to its solid line position (FIG. 1), freeing the storage loop 108, 109 to provide sufficient instantaneous slack to enable retraction of the capstan 93 and guides 71, 78, 79 and 101 without harm to the tape. Guide 61 is left in upstanding position, and the tape is rewound on former supply hub 16 until it is snug on guide 61. This condition is signalled by the sensor 59 as tape tension rises despite slowing of the hub 16, and the hub is halted by the controller 24.

The rewind function is then initiated by the controller 24, which causes the loaded hub 17 (as shown in FIG. 1) to pay out tape while hub 16 winds it in, the speed being regulated by a signal (arrow 111) from a longitudinal head 112 near the exit guide 113 of the chamber 44. Head 112 reads a speed control track on the tape.

When the rewind function is completed, a signal is sent by the sensor 59 to the controller, which then retracts guide 61 and rewinds an initial supply on takeup hub 17, and may then inactivate all functions, or place the apparatus in standby condition while a signal (arrow 114) is sent to a cassette changing apparatus, which is not a part of this invention, and is not shown. It will be understood that the invention can also be used in a reverse process, in which tapes are recorded on the machine of the invention and replayed on the average wrap machine.

It will also be understood that the invention concept disclosed herein may be more broadly applied to the production of pairs of compatible transports having different numbers of heads, so long as the ratio of number of heads to drum radius varies as a direct proportion in both transports (number of heads being of course an integer); and so long as the ratio of the two radii varies inversely with the ratio of angular drum speed.

I claim:

1. A magnetic tape transport for the automatic threading and replay of cassette-mounted tapes produced upon a recorder having a first-speed rotating head and guide assembly around which the tape is helically wrapped in a substantially 360-degree omega path, said replay transport being characterized in that:

a two-headed rotating head and guide drum assembly is provided having substantially twice the diameter of said first-speed assembly;

means are provided for driving the two-headed assembly at substantially half the rotational speed of said first-speed assembly;

means are provided for mounting said cassette adjacent to said two-headed assembly;

threading means are provided for pulling a loop of tape from said mounted cassette and for extending said loop in a threading path to form a helical wrap around a substantially 180-degree sector of said two-headed drum; and means are provided to be operable at a predetermined length of said loop to ensure separation of the opposite shanks of said loop during a threading mode of the transport, and to become inoperable for such separation during a de-threading mode of the transport;

said shank separating means including a plurality of retractable guides each having a retracted position remote from said threading path of said loop, and an operating position on said path and between the shanks of said loop;

said guides being positioned along said loop-threading path in spaced relation such that in said operating positions thereof the radially outer shank of tape from guide to guide, during the operating mode, is spaced at all points away from the guide drum and from the radially inner shank in contact with the drum; and said shank separating means also includes means for causing each of said guides to move from retracted to operating position sequentially as said tape loop passes the guide during the threading mode, but also causing all of said guides to retract simultaneously at the beginning stage of said de-threading mode.

2. An automatic-threading transport as described in claim 1 and further characterized in that:

said threading means is a differential air-pressure threading means in which:

a substantially air-tight housing is provided enclosing said two-headed assembly and communicating with said mounted cassette; and differential air-pressure means are provided communicating with said housing for pulling said loop.

3. A transport as described in claim 2 and further characterized in that:

said shank separating means also includes tape presence sensing means immediately downstream from each of said guides in the threading direction of the tape loop for sensing the arrival of said loop at the respective guide, and for causing said respective guide to move from the retracted to operating position on the concave side of said loop after the loop has passed over the retracted guide.

4. A transport as described in claim 3, wherein said tape presence sensing means includes differential air pressure sensing means in the outer wall of said housing for providing a guide operating signal whenever the tape loop occludes said sensing means in the threading mode.

5. A transport as described in claim 4 and including manually operable mode selection control means for the selection of said threading mode, and also of a de-threading mode, in which a retraction signal is provided to said guides in preparation for withdrawal of said tape loop from said housing.

6. A transport as described in claim 5, in which the most remote of said guides from the mounted cassette in the threading direction is a tape-driving capstan with associated tape presence sensing means.

7. A transport as described in claim 6 wherein a plurality of magnetic transducing heads of the longitudinal tape-motion transducing type are mounted to engage said tape between said capstan and the wrapped portion of said tape on said drum, and a head shield element is mounted in association with said capstan for concomitant retraction and intrusion into said loop opposite the position of said heads.

8. A transport as described in claim 6, and also including a tape slack storage arm mounted upstream from said capstan and heads and arranged to swing from a retracted position outside said loop to an operating position carrying radially inward a segment of the outer tape shank between a pair of guides; and means included in said mode selection control means for driving said arm from retracted to operating positon after intrusion of said capstan during the threading mode and for retracting said arm at the beginning of the de-threading mode to free a slack length of tape around said capstan thus to facilitate the subsequent retraction of the capstan.

9. A transport as described in claim 5, in which the retractable guide that is most proximal on the threading path to the cassette mounting means is controlled by the mode selection means to remain in operating position during and after de-threading mode to maintain a short loop of tape extending from said mounted cassette during a subsequent rewind mode, said most proximal guide being retracted under control of the mode selection means when rewind is completed; and said cassette mounting means includes motor drive means for the reels of said cassette, said drive means being controlled by said mode selection and control means to drive said reels in both forward and rewind modes.

10. A transport as described in claim 9, wherein a tape loop vacuum column is provided between said cassette mounting means and said most proximal retractable guide thereto, for establishing and maintaining a constant tension in said tape under the control of said mode selection and control means.

11. A transport as described in claim 10, wherein a longitudinal transducing head assembly is provided on the tape path between said vacuum column and said most proximal retractable guide for reading position information from said tape during rewind mode, said head assembly being coupled to communicate said information to said mode selecting and control means for control of said rewind mode.

12. A magnetic tape transport for the automatic threading and transducing of cassette-mounted tapes of the type including a two-headed rotating head and guide drum assembly, means for mounting said cassette adjacent to the two-headed assembly, and threading means for pulling a loop of tape from the mounted cassette and for extending the loop in a threading path to form a helical wrap around a substantially 180-degree sector of the drum, characterized in that:

means are provided to be operable at a predetermined length of said loop to ensure separation of the opposite shanks of said loop during a threading mode of said transport, and to become inoperable for such separation during a de-threading mode of the transport;

said shank separating means including a plurality of retractable guides each having a retracted position remote from said threading path of said loop, and an operating position on said path and between the shanks of said loop;

said guides being positioned along said loop-threading path in spaced relation such that in said operating positions thereof the radially outer shank of tape from guide to guide is spaced at all points away from the guide drum and from the radially inner shank in contact with the drum; and said shank separating means also includes means for causing each of said guides to move from retracted to operating position sequentially as said tape loop passes the guide during the threading mode, but also causing all of said guides to retract simultaneously at the beginning stage of said de-threading mode.

\* \* \* \* \*